(12) United States Patent
Bierdeman et al.

(10) Patent No.: US 10,834,481 B2
(45) Date of Patent: Nov. 10, 2020

(54) AUDIO RACK/CHASSIS AND PATCHBAY DEVICE

(71) Applicant: Black Lion Audio Chicago, Inc., Chicago, IL (US)

(72) Inventors: Nathaniel T. Bierdeman, Chicago, IL (US); Daniel S. Larson, Chicago, IL (US)

(73) Assignee: Black Lion Audio Chicago, Inc., Chicago, IL (US)

( * ) Notice: Subject to any disclaimer, the term of this patent is extended or adjusted under 35 U.S.C. 154(b) by 0 days.

(21) Appl. No.: 16/046,890

(22) Filed: Jul. 26, 2018

(65) Prior Publication Data
US 2020/0037051 A1 Jan. 30, 2020

(51) Int. Cl.
*H04Q 1/02* (2006.01)
*H04H 60/04* (2008.01)
*H04Q 1/06* (2006.01)

(52) U.S. Cl.
CPC .............. *H04Q 1/13* (2013.01); *H04Q 1/025* (2013.01); *H04Q 1/066* (2013.01); *H04Q 2201/10* (2013.01)

(58) Field of Classification Search
CPC .......... H04Q 1/13; H04Q 1/025; H04Q 1/066; H04Q 2201/10; H04H 60/04
See application file for complete search history.

(56) References Cited

U.S. PATENT DOCUMENTS

2016/0269134 A1* 9/2016 Malone ................ H04H 60/04
2017/0324494 A1* 11/2017 Tillman ................ H04H 60/04

* cited by examiner

*Primary Examiner* — Regina N Holder
(74) *Attorney, Agent, or Firm* — K&L Gates LLP

(57) ABSTRACT

Disclosed is an audio processing system that includes various audio signal inputs and outputs for producing distributed audio signals for use in audio processing and related applications. The digital and/or analog audio signal processing system includes a rack/chassis containing a central routing card, a plurality of slots for receiving modules and a plurality of inputs and outputs for receiving and producing various processed audio signal inputs and outputs.

10 Claims, 6 Drawing Sheets

AUDIO RACK/CHASSIS AND PATCHBAY DEVICE

TECHNICAL FIELD

Aspects of the present disclosure involve signal processing devices and systems, and in particular, devices and systems that receive various audio inputs and output various audio outputs involving audio signals.

BACKGROUND

A patchbay (also called a patch panel or breakout panel) is a panel that provides cable connections for flexible signal routing between various devices (e.g., audio devices) and equipment. More specifically, cables connect to devices (e.g. jacks) at both front and rear faces of the patchbay thereby enabling connections to be dynamically established or broken between devices. Patchbay devices are typically arranged so that a number of circuits, usually of the same or similar type, appear on jacks for monitoring, interconnecting, and testing circuits in a convenient, flexible manner.

A 500 Series rack (also called a chassis) is a centralized box device that provides power and input/output routing for 500 Series form factor audio modules. 500 Series racks enable consumers to use specific audio modules that were typically only available in large audio console desks and rack mountable equipment. Thus, the 500 Series rack is designed to provide the power and input/output to smaller modules that provide functions similar or equivalent to the modules normally received from the larger consoles or rack units.

The ability to connect or otherwise combine a patchbay device with a 500 Series rack for use in audio signal processing and routing is labor-intensive and expensive. It is with these problems, among others, that aspects of the present disclosure were conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings, the like reference characters refer to the same parts throughout the different views. The drawings depict only typical embodiments of the present disclosure and, therefore, are not to be considered limiting in scope.

DETAILED DESCRIPTION

Figure 1A:
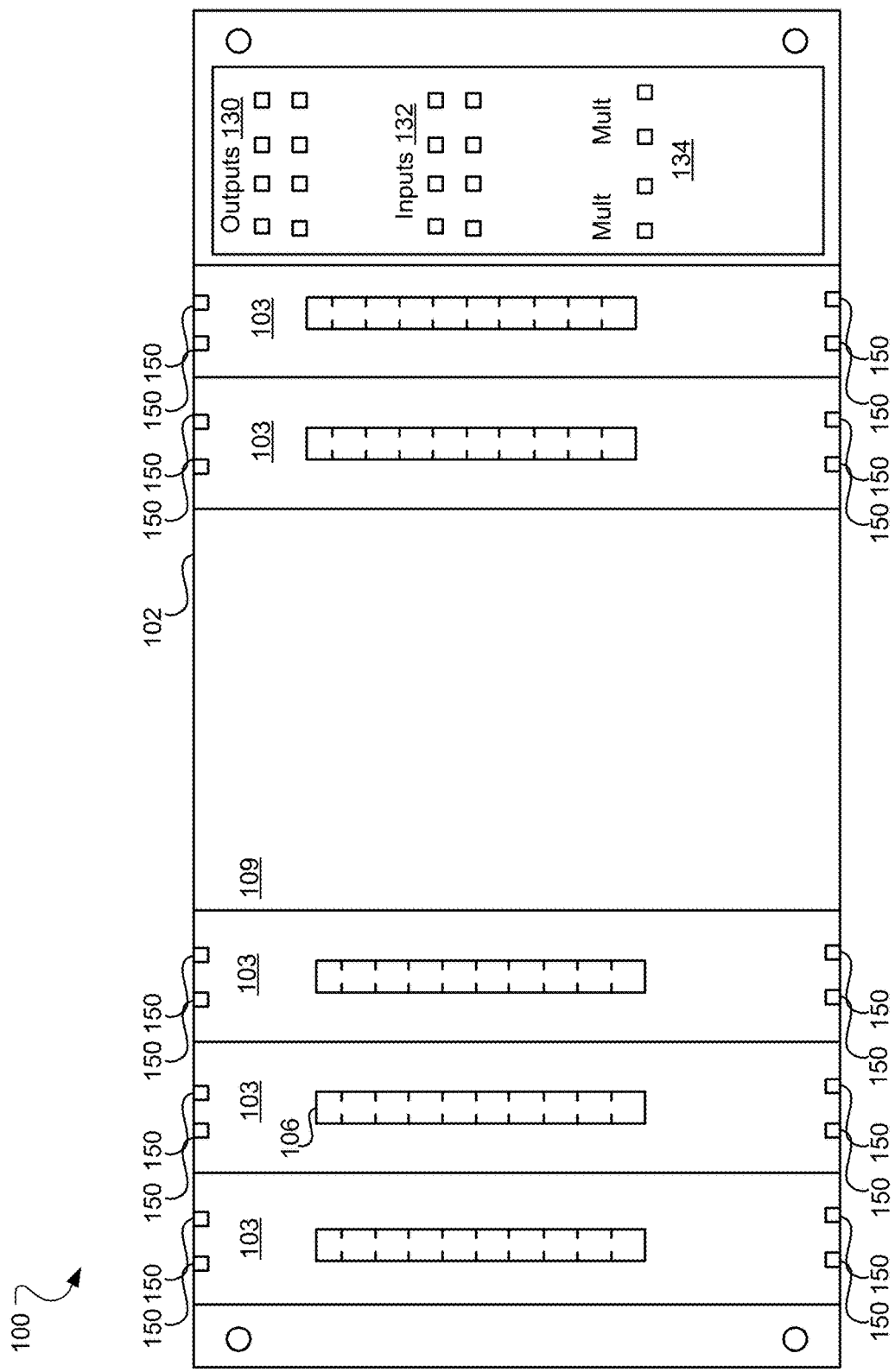
FIG. 1A is a front view of a rack/chassis, according to aspects of the present disclosure.

Aspects of the present disclosure involve an audio signal processing system (digital and/or analog) that includes various audio signal inputs and outputs for producing distributed audio signals for use in audio processing and related applications. In various aspects, the digital and/or analog audio signal processing system includes a rack/chassis containing a central routing card, a plurality of slots for receiving input cards (e.g., 500 Series cards) referred to herein as "modules", and a plurality of outputs for receiving and producing various processed audio signal outputs. The digital and/or analog audio signal processing system further includes a plurality of integrated power supply components and full set of connectors (e.g., XLR connectors) to enable the various inputs and outputs.

In one specific example, the disclosed audio signal processing system may combine the function of a typical 500 Series rack/chassis, such as a Lunchbox® designed by API, with the functionality of a patchbay(s). Generally speaking and as explained above, a 500 Series rack is a system for mounting compact modules into a tabletop or rack-mountable chassis. For example, a typical 500 Series rack/chassis may include: 6-8 slots (commonly referred to as "bays") for receiving modules; DB-25 (D-Sub) connectors for input/output; one or more universal power supplies (e.g., 100-250V, 47 to 63 Hz); and mechanisms for enabling easy rack-mounting. A patchbay (also called a panel) is a device that provides or otherwise enables cable connections for routing signals between devices. More specifically, cables connect to devices (e.g., jacks) at front and rear panels of the patchbay. The devices are configured to enable a plurality of circuits to appear on jacks for monitoring, interconnecting, testing, etc., in a flexible manner. For example, patchbays are typically used to allow audio technicians to change the path of select signals, without the use of dedicated switching equipment.

Although many audio environments use both rack/chassis (e.g., 500 Series rack) and external patchbays together when processing audio signals, currently no technology exists that efficiently and seamlessly combines the dynamic nature of the patchbay with the modularity of the rack/chassis in a single audio signal processing device or apparatus. Rather, typical devices and arrangements require users to manually connect a 500 Series rack to an external patchbay in a static way, wherein expensive external cables are used to connect the two devices.

For example, in order to fully employ a patchbay, a user must choose the pieces of audio equipment he/she wants to be hard-wired to the patchbay, choose the correct I/O connections for each piece of unique gear, and have those connections installed onto one end of the cabling being used to wire the patchbay. The user would then need to connect the other end of the cable to the patchbay through soldering individual connections, large form connectors or punchblocks, etc.

In order to route signals between external devices and modules in a 500 Series rack, a user must understand that the I/O for a vast majority of 500 Series racks is located on the back of the unit via XLR or DB25 connectors. Thus, in order to choose where one of the module's signals is taken from or sent to, the user must change the cabling on the back of the unit (which is often times installed in a cabinet or large rack). As a result, any routing decisions that need to be made during the recording or mixing process will be time consuming, because the user would have to manually re-connect the cabling, which will ultimately lead to loss of productivity. Further, if an external patchbay or accessing the rear of the 500 Series rack/chassis is not an option, the user will be forced to power down the rack/chassis and swap the order of the modules to make any such changes.

Additionally, a patchbay allows for the dynamic routing of signals between inputs and outputs of devices statically wired to it, and traditionally requires an end user to spend a significant amount of time and money to obtain and install it. The front panel of a patchbay consists of rows of jacks that can be connected together using "patch cables." The back panel of a patchbay consists of solder posts, punch blocks, or various types of jacks that are statically wired to devices that an end user may want to connect together, or "patch." The patchbay's front panel jacks and rear panel posts/jacks are connected internally, thus, all of the devices' inputs and outputs that are statically wired to the back panel posts/jacks of the patchbay are conveniently located and accessible in one place, the front panel jacks of the patchbay, and may be "patched" together using patch cables.

Abstractly speaking, an external patchbay wired to a 500 Series rack/chassis functions identically to a 500 Series rack/chassis fitted with a built-in patchbay, however, a 500 Series rack/chassis fitted with a built-in patchbay is a more attractive solution for adding flexible signal routing between modules in a 500 Series setup and external devices for the following reasons: an external patchbay is expensive to purchase in addition to a 500 Series rack/chassis; an external patchbay requires very expensive cabling & connectors in addition to the patchbay itself; an external patchbay requires a significant amount of time to hook up and install; and an external patchbay is not a mobile-friendly solution for signal routing between 500 Series devices. A 500 Series rack/chassis fitted with a built-in patchbay does not suffer from any of the abovementioned issues associated with an external patchbay wired to a 500 Series rack/chassis.

Additionally, an external patchbay undermines key advantages of the 500 Series format, which offers a standard for small footprint, low cost, mobile-friendly gear. Therefore, a 500 Series rack/chassis fitted with a built-in patchbay provides for much-needed, flexible signal routing in a convenient, affordable, and mobile manner that's consistent with the design standards of the 500 Series format.

The present disclosure solves these technical issues, and others, by describing an audio signal processing system and/or device or apparatus that marries or otherwise couples the functionality and usability of a typical 500 Series rack/chassis and the functionality and usability of a patchbay into a single apparatus and/or device.

Referring now to FIG. 1A, in accordance with aspects of the present disclosure, an audio signal processing system or device 100 for use in an environment requiring audio signal processing is provided. As illustrated, the audio signal processing system 100 comprises a rack/chassis 102 having a front-facing panel 109 containing a plurality of slots 103 for receiving and securing a plurality of modules (e.g., printed circuit boards). In one specific example, each slot 103 may have mechanical guides 150 for receiving at least one module, such as a signal processing card, among other types of audio modules. In other examples, each slot 103 may not require mechanical guides and thus a module may simply be directly inserted into a given slot 103. In yet other embodiments, each slot 103 may receive a power supply, although the power supply may be located elsewhere within or outside of the audio signal processing system or device 100.

Figure 2:
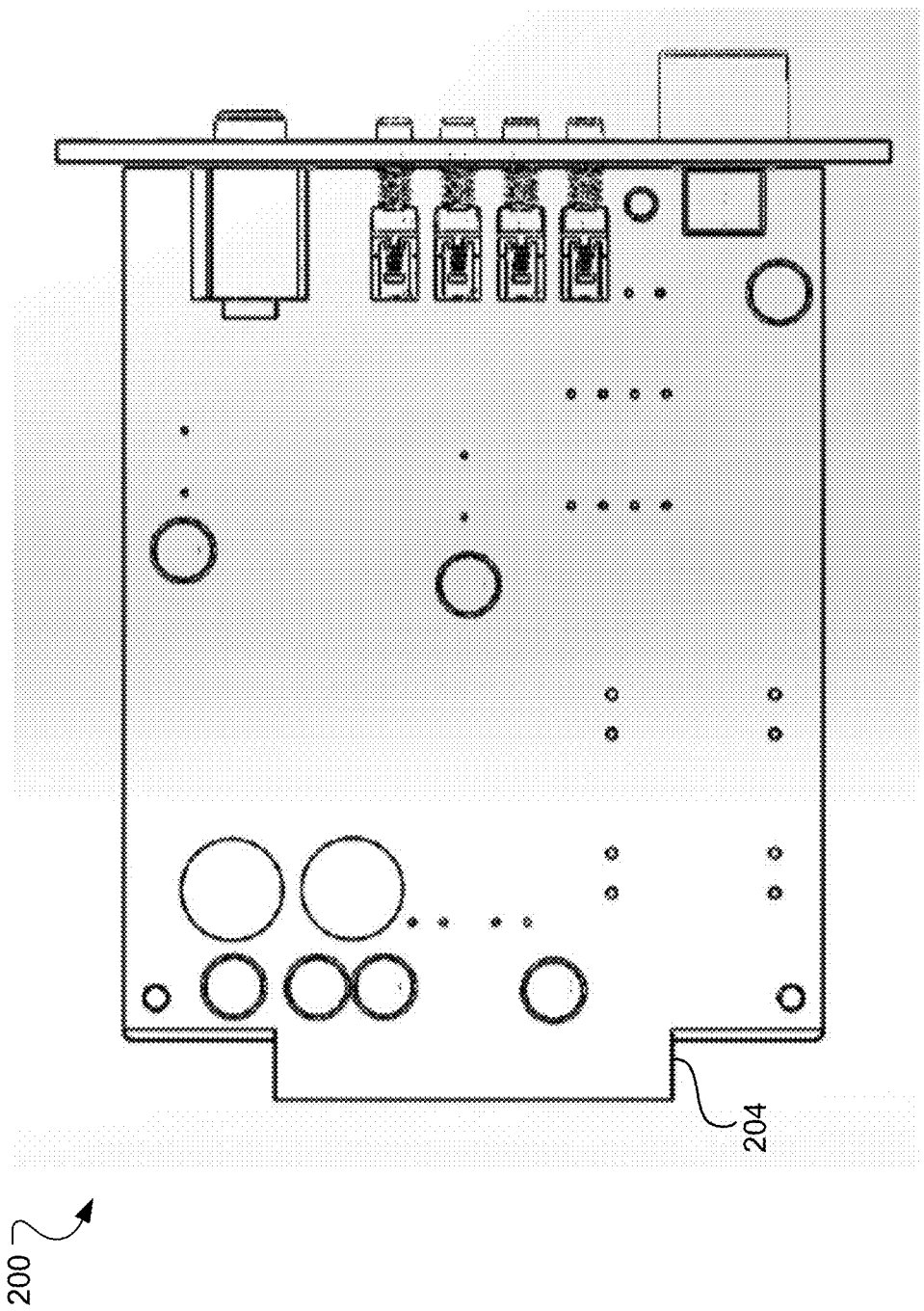
FIG. 2 is a schematic of a module that may be installed in a rack/chassis, according to aspects of the present disclosure.

FIG. 2 illustrates an example module 200 that may be inserted into one of the slots 103 of the rack/chassis 102. As illustrated in FIG. 2 and with reference to FIG. 1A, the module 200 is able to be inserted into connectors 106 of the slots 103. Referring again to FIG. 1A, the rack/chassis 102 may be mounted in a standard audio equipment rack and is designed to accept the various modules (e.g., module 200) into their respective slots 103, where electrical connections (e.g., incoming and outgoing) for use in audio processing are made. In the illustrated embodiment, the rack/chassis 102 is constructed with eight slots 103 to house eight modules (e.g., eight of the modules 200). However, it is contemplated that the rack/chassis 102 may be constructed with enough slots 103 to house a varying number of modules 200 that include more or less than eight.

Figure 1B:
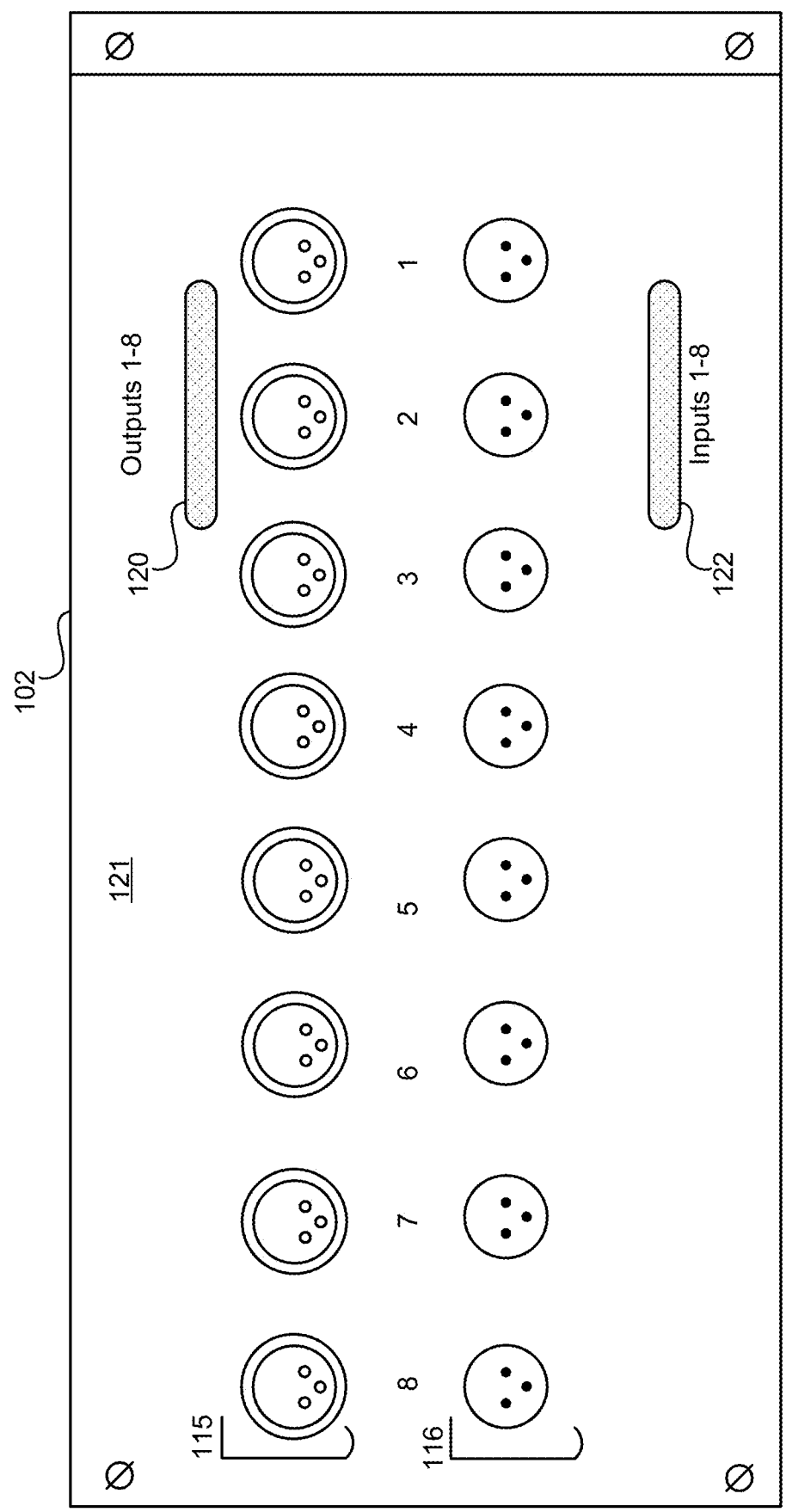
FIG. 1B is a rear view of a rack/chassis, according to aspects of the present disclosure.

FIG. 1B illustrates a rear panel 121 of the rack/chassis 102, according to aspects of the present disclosure. As illustrated, the rear panel 121 includes various input and/or outputs, including a plurality of XLR jacks and DB25 connectors (illustrated as connections 1-8). The rear panel 121 provides access to the inputs and outputs for each module 200 loaded into each slot 103. As specifically illustrated, the rear panel 121 has 16 XLR jacks, each of which feature an XLR connection. The jacks are illustrated in two sections: an output section 115 with jacks 1-8, and an input section 116 with jacks 1-8. The rear panel 121 also includes two DB25 connectors 120 and 122.

Referring again to FIG. 1A, the front-facing panel 109 of the rack/chassis 102 includes a series of outputs 130, a series of inputs 132, and a series of mult jacks 134. A "mult" accepts a single instance of a signal as its input, and outputs multiple instances of the signal. A mult connection allows an end user to process and/or use the multiple instances of a signal in various ways. The series of outputs 130, series of inputs 132, and series of mult connections 134 are built directly into the rack/chassis 102 and function as a typical patchbay (e.g., similar or the same as an external patchbay). More specifically, the series of outputs 130, series of inputs 132, and series of mult connections 134 on the rack/chassis 102 are connected to the various XLR and DB25 inputs and outputs on the back plate or rear panel 121, as well as the I/O of each module connector 106, which enables modules contained within a given slot 103 to be connected together or patched, thereby enabling the routing of a plurality of electrical signals to and from various audio equipment and devices.

Figure 3:
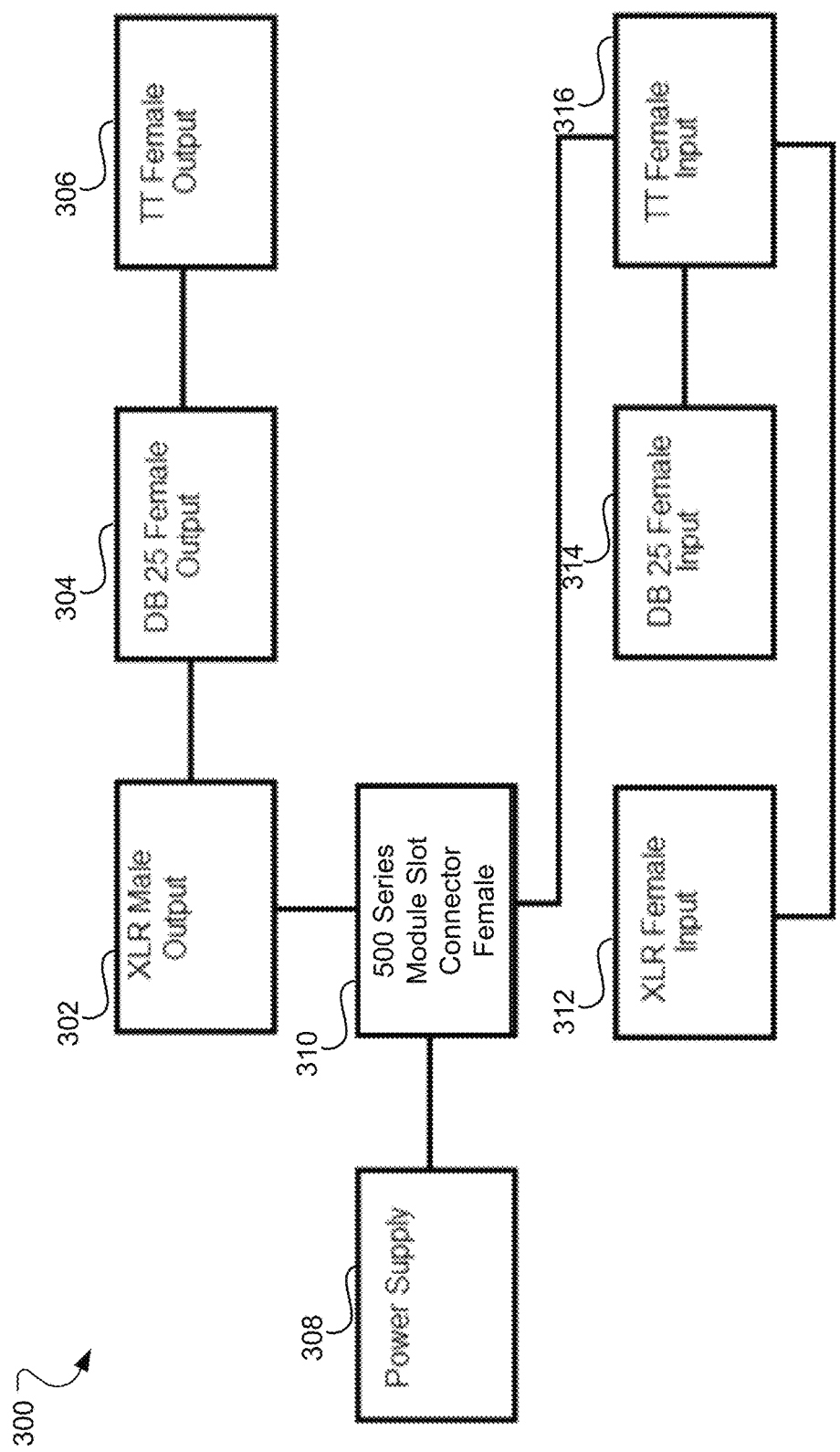
FIG. 3 is a block diagram illustrating connections between rack/chassis module slots and built in patchbay jacks, according to aspects of the present disclosure.

FIG. 3 illustrates an example block diagram 300 illustrating connections between rack/chassis module slots and the various jacks and connections that function as a patchbay. As illustrated, a module slot connector 310 (similar to connector 106) is connected or otherwise wired to a male XLR output jack 302, which is connected to a female DB25 output jack 304, which is connected to a female TT output jack 306. Additionally, the module slot connector 310 is connected to a female XLR input jack 312, which is connected to a female DB25 input jack 314, which is connected to a female TT input jack 316. The module slot connector 310 may also be connected to a power supply 308. In one specific example, the female TT jacks (e.g., 306 and 316) may be all or part of the mult(s) 134.

Figure 4:
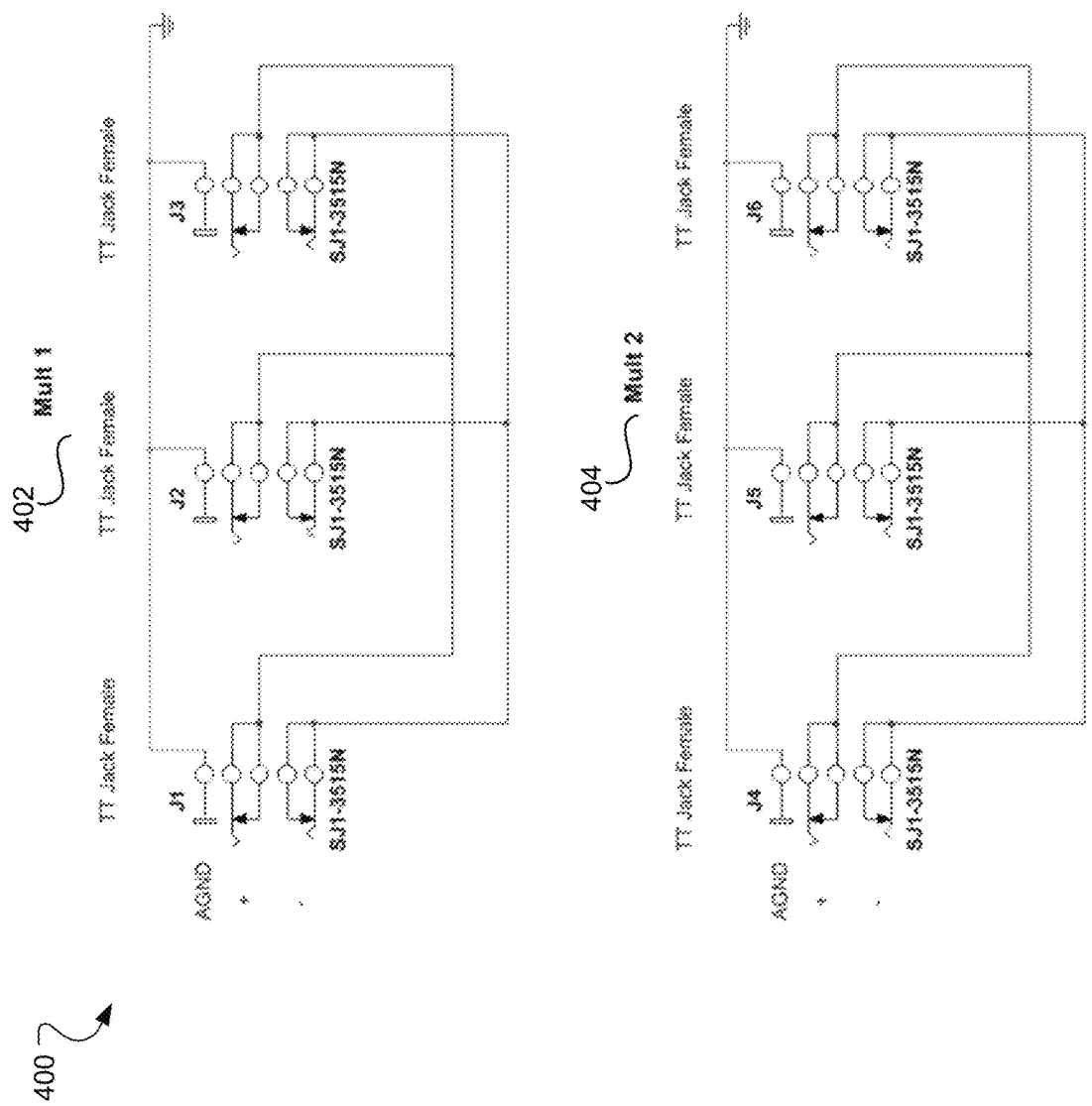
FIG. 4 is a schematic of a patchbay mult wiring diagram, according to aspects of the present disclosure.

FIG. 4 is a wire schematic 400 of part of a patchbay directly integrated into a 500 Series rack, illustrating mult connections 402 and 404 that split signals for use in parallel signal processing and routing. As illustrated, an input jack receives an audio signal and routes the signal to two output jacks, effectively providing an end user with two instances of the same signal.

Figure 5:
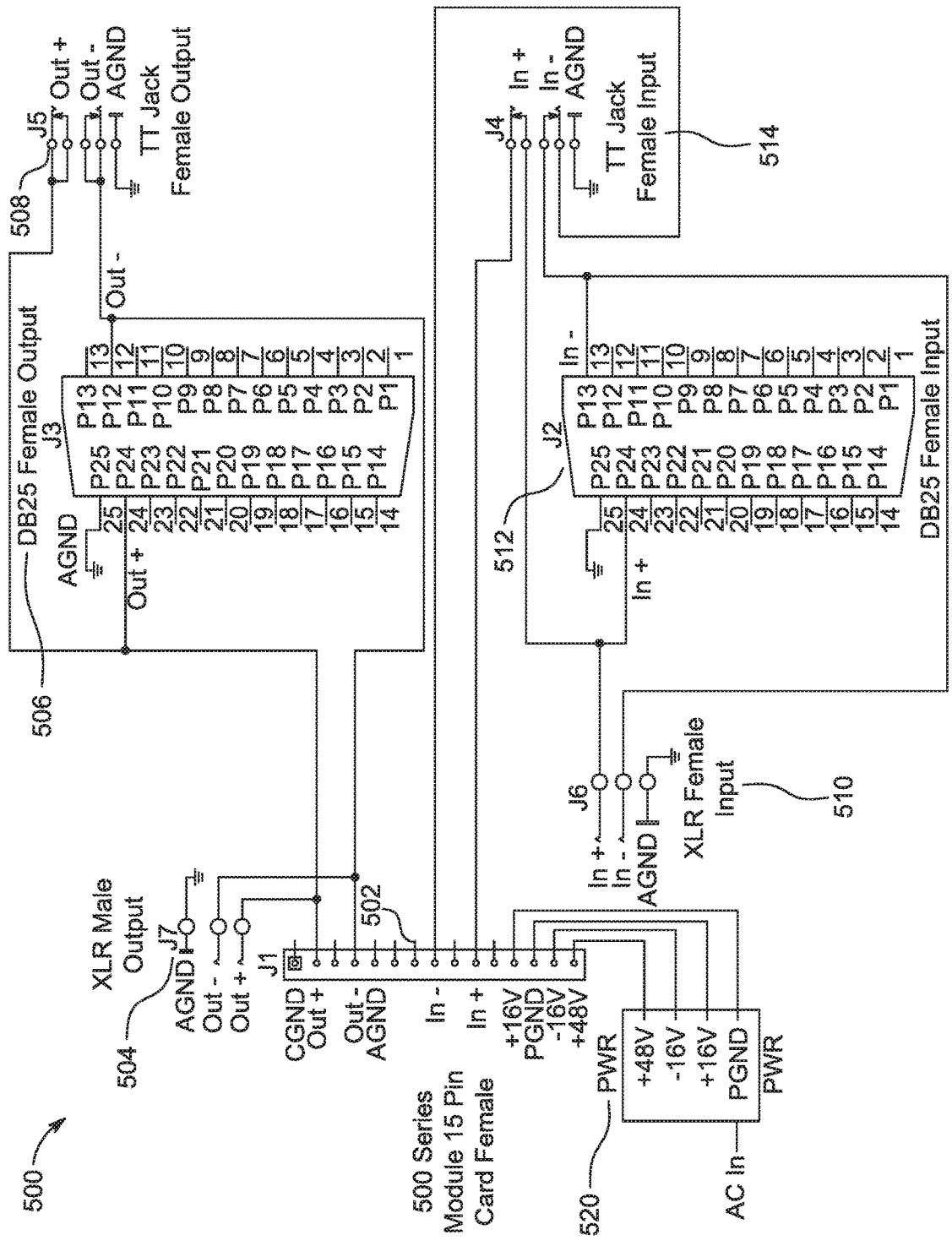
FIG. 5 is schematic of a Patchbay Rack 8 illustrating connections between rack/chassis module slots and built in patchbay jacks, according to aspects of the present disclosure.

FIG. 5 is a wire schematic 500 of a patchbay directly integrated into a 500 Series rack, illustrating connections between rack/chassis slots, various built in patchbay jacks, various back panel jacks, and module slot power rails. As illustrated, these connections make possible the integration of an external patchbay into a 500 Series rack/chassis without the need for additional wiring or connectors between the 500 Series rack/chassis and patchbay.

In one specific embodiment, FIG. 5 illustrates a single balanced input and output connection of a 500 Series rack/chassis with an integrated patchbay. Also shown is the power connection 520 from a 500 Series rack/chassis power supply to a 500 Series rack/chassis slot connector 502. A common balanced audio connection is made up of 3 signals: + or hot, − or cold, and ground or GND (as illustrated at the various connections). The balanced output is an unbroken connection between the 500 Series rack/chassis slot connector 502, Male XLR jack 504, Female DB25 Output jack 506, and a Female TT Output jack 508. The balanced input is an unbroken connection between the Female XLR Input jack 510, Female DB25 Input jack 512, a Female TT Input jack 514, as well as an unbroken connection between the Female TT Input jack and the 500 Series chassis/rack slot connector 502. However, the Female TT Input jack has a breakable connection that can disconnect the 500 Series rack/chassis slot connector 502 from the Female DB25 Input jack 512 and Female XLR Input jack 510 if a TT cable is plugged into the Female TT Input jack 514. Power is distributed to a 500 Series rack/chassis slot connector through 4 separate connections, illustrated at 520. A positive 48 volt line, a positive 16 volt line, a negative 16 volt line, and ground.

Thus, the audio signal processing system disclosed herein and discussed above enables users to configure the system to generate a plurality of inputs and outputs respectively, and enables the user to configure various audio processing components, such as effects, compressors, equalizers, among others. Moreover, the unique configuration of the audio signal processing system and/or device enables users to combine the functionality of a typical patchbay and the functionality of a typical rack/chassis (e.g., a 500 Series rack) into a single device.

An illustrated example will now be provided. In the example, assume the following components are being used as modules capable of being inserted into a 500 Series rack/chassis (e.g., the rack/chassis 102) in addition to a microphone, a recording interface, and a 500 Series Rack: a 500 Series Auteur microphone preamp, a 500 Series B12A microphone preamp, a 500 Series equalizer, a 500 Series compressor, and a 500 Series reverb unit. Each of these 500 Series modules has a different function in processing audio and the EQ, Compressor and Reverb (processor's) are interchangeable in their place in the chain. The recording interface takes analog audio and converts it to digital audio, which is fed to a computer for recording purposes.

The signal chain will be:
Microphone-Preamp-Processor 1-Processor 2-Processor 3-Interface-Computer.

In a typical setup, these devices will be semi-hard wired to the recording interface via the 500 Series rack back panel inputs and outputs. In order to use each of these devices, the user would have the modules loaded into the 500 Series rack and the cables daisy chained in and out of each module slot until the 3$^{rd}$ processor, which would be semi-hard wired to an input of the recording interface.

Assume the user chooses the following configuration, which would be a static setup, wherein a 500 rack would more than likely be installed in a larger gear cabinet, which is not easily accessible or changeable.

Microphone-Auteur-EQ-Compressor-Reverb-Interface-Computer

The B12A preamp is not being used, but is installed in the rack/chassis.

The user likes this setup. However, at some point in the future, the user decides it would be beneficial to use the B12A as the microphone preamp instead of the Auteur. In a normal setup, the user would have to either access the back of the 500 Series rack to move the microphone cable from the Auteur to the B12A, or power the rack/chassis down completely, unscrew the holding screws, remove each module, and trade where each one is inserted in the rack/chassis.

The user enjoys the new signal chain until he/she decides the Reverb is not working well anymore. In order to take the Reverb out of the chain, the user will need to power down the 500 Series rack, move the gear cabinet out, and reach through the cluster of cables and change the cabling around to omit the Reverb.

Now that the user hears the signal without the Reverb, the user realizes that the EQ should be placed after the Compressor in the chain. Again, the user must either power down everything, unscrew each module and swap their placement, or move the gear cabinet out and rearrange the cabling from behind.

Everything has been accomplished except the user made a mistake; the recording sounded better when the EQ was before the Compressor, as it was originally. Thus, the user must, again, either power down the whole 500 Series rack, unscrew modules and swap them around, or crawl behind the gear cabinet to rearrange cables.

The whole time the user is working on these routing issues, there is a client waiting on them to find the best signal chain for their unique voice. Time is being wasted, patience is being tested, gear is being worn out, and possible breakages are happening as units are being plugged, unplugged and turned off. The above is just one small example of how limited the signal routing of a traditional 500 Series rack truly is. The solution is the disclosed signal processing device and/or system that integrates an internal patchbay directly into the rack/chassis. Such a device allows the user to make any configuration of signal flow to and from 500 Series modules loaded into the rack possible. The I/O for each 500 module is available on the patchbay and is front and center in any gear cabinet. Signal chains can be quickly tried and discarded as fast as a user can plug cables into the patchbay.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. An apparatus comprising:
    a chassis comprising:
        a plurality of bays for receiving a plurality of audio module components, wherein the plurality of bays are accessible through a front side of the chassis;
        a first set of analog inputs/analog outputs mounted on a front panel of the chassis;
        a second set of analog inputs/analog outputs mounted on a rear panel of the chassis, the second set of analog inputs/analog outputs different from the first set of analog inputs/analog outputs, the rear panel enclosing the plurality of bays inside the chassis; and a circuit board fully enclosed in the chassis to:
  electrically connect respective bays of the plurality of bays with respective analog inputs/analog outputs of the first set of analog inputs/analog outputs;
  electrically connect respective bays of the plurality of bays with respective analog inputs/analog outputs of the second set of analog inputs/outputs; and
  electrically connect the first set of analog inputs/analog outputs with the second set of analog inputs/analog outputs.

2. The apparatus of claim 1, wherein the chassis is a 500 Series chassis and wherein each module of the plurality of module components is a 500 Series audio module component.

3. The apparatus of claim 1, wherein the plurality of bays comprises eight bays.

4. The apparatus of claim 1, wherein the plurality of bays partially houses the plurality of audio module components.

5. The apparatus of claim 1, wherein respective audio module components of the plurality of audio module components are at least one of: a preamp module, a compressor module, a dynamics module, an equalizer module, an effects module, and a specialty module.

6. The apparatus of claim 1, each bay of the plurality of bays includes a connector in which an audio module component of the plurality of audio module components is inserted.

7. The apparatus of claim 1, wherein the second set of connectors includes XLR jacks and OB25 connectors.

8. The apparatus of claim 1, wherein the front panel further includes a series of mult jacks electrically connected to:
  the second set of analog inputs/analog outputs of the rear panel; and
  respective bays of the plurality of bays.

9. The apparatus of claim 1, wherein the chassis further comprises a power supply to provide power to the circuit board.

10. The apparatus of claim 1, wherein the respective bays of the plurality of bays electrically connected with the respective analog inputs/analog outputs of the second set of analog inputs/analog outputs and the respective bays of the plurality of bays electrically connected with the respective analog inputs/analog outputs of the first set of analog inputs/analog outputs function as a patchbay.

* * * * *